(12) United States Patent
Reichert et al.

(10) Patent No.: US 6,627,307 B1
(45) Date of Patent: Sep. 30, 2003

(54) COMPOSITE MATERIAL, ESPECIALLY FOR REFLECTORS

(75) Inventors: Werner Reichert, Wuppertal (DE); Klaus Ganz, Wuppertal (DE)

(73) Assignees: ALANOD Aluminium-Veredlung GmbH & Co., Ennepetal (DE); Alusuisse Singen GmbH, Singen (DE)

(*) Notice: Subject to any disclaimer, the term of this patent is extended or adjusted under 35 U.S.C. 154(b) by 0 days.

(21) Appl. No.: 09/554,716

(22) PCT Filed: Nov. 5, 1998

(86) PCT No.: PCT/EP98/07055
§ 371 (c)(1),
(2), (4) Date: Jul. 11, 2000

(87) PCT Pub. No.: WO99/26088

PCT Pub. Date: May 27, 1999

(30) Foreign Application Priority Data

Nov. 17, 1997 (EP) .............................. 97120113

(51) Int. Cl.$^7$ .................. B32B 15/04; B32B 15/08; B32B 18/00; B32B 27/06; B32B 3/00
(52) U.S. Cl. .................. 428/332; 428/336; 428/413; 428/414; 428/416; 428/457; 428/458; 428/469; 428/912.2; 428/913
(58) Field of Search .............................. 428/912.2, 450, 428/429, 413, 414, 416, 446, 457, 458, 461, 472, 469, 913, 332, 336

(56) References Cited

U.S. PATENT DOCUMENTS

| | | | | |
|---|---|---|---|---|
| 4,334,780 A | * | 6/1982 | Pernick | 356/359 |
| 4,348,463 A | * | 9/1982 | Ohno et al. | 428/429 |
| 4,482,209 A | * | 11/1984 | Grewal et al. | 350/642 |
| 5,007,710 A | * | 4/1991 | Nakajima et al. | 350/166 |
| 5,527,562 A | | 6/1996 | Balaba et al. | 427/430.1 |
| 5,614,126 A | * | 3/1997 | Gruber et al. | 525/438 |
| 5,828,493 A | * | 10/1998 | Bischer, Jr. et al. | 359/584 |

FOREIGN PATENT DOCUMENTS

| | | |
|---|---|---|
| EP | 0331201 B1 | 6/1993 |
| EP | 0573163 * | 8/1993 |
| EP | 0573163 A1 | 12/1993 |
| EP | 0519784 B1 | 6/1995 |
| JP | 363191011 A * | 8/1988 |

* cited by examiner

*Primary Examiner*—Paul Thibodeau
*Assistant Examiner*—Nikolas J. Uhir
(74) *Attorney, Agent, or Firm*—Harness, Dickey & Pierce, P.L.C.

(57) ABSTRACT

The present invention relates to a composite material, in particular for reflectors, having a metallic support (1) in strip form, an intermediate layer and having a multilayer optical system (3) which is applied to the intermediate layer (2). A non-metallic protective layer (4), which consists of a low-absorption material and has a thickness ($D_4$) of from 5 to 20 nm, preferably from 5 to 10 nm, is applied to the multilayer optical system (3).

25 Claims, 2 Drawing Sheets

COMPOSITE MATERIAL, ESPECIALLY FOR REFLECTORS

The present invention relates to a composite material, in particular for reflectors, having a metallic support in strip form, an intermediate layer and having a multilayer optical system which is applied to the intermediate layer.

To characterize the reflective properties of a composite material of this nature, the spectral coefficient of the total reflection and that of the diffuse reflection are measured (DIN 5036). Different demands are imposed on the optical properties of reflectors. In many cases, the aim is to have a composite material with a high total reflectivity, i.e. with low reflection losses. If, in addition, a mirror nature, i.e. a low scattering of the light at the reflector surface or a low level of diffuse reflection, is required, the production of such a composite material involves a very high level of outlay in production engineering terms. In some cases, a higher level of diffuse reflection, and in certain circumstances even an absorptive behaviour with regard to the total reflectivity, is also desired. In some special applications, the electromagnetic radiation wavelength which is to be reflected may lie in the UV or in the IR range.

The base material used for reflectors with a high total reflectivity and a low diffuse component, is generally rolled aluminium of a minimum purity of 99.8%, for which, since the crude aluminium has a sensitive surface, an intermediate layer has to be applied in order to protect against mechanical and chemical influences and thus maintain its suitability for use. Such a protective intermediate layer is formed in a wet-chemical process which is referred to overall as anodizing and comprises an electrobrightening treatment and an anodic oxidation. By changing the purity and/or the roughness depth, it is possible to influence the level of total reflection, while the level of diffuse reflection can be influenced by making controlled changes to the rolled structure. In the wavelength range of visible light (380 to 780 nm), the total reflection of composite materials of this nature is from 83% to 87%. Considerable process engineering outlay, primarily a high outlay on rolling technology, as well as a high level of purity of the material used, are required in order to achieve a low level of diffuse reflection, in particular of below 4%, resulting in high costs. Despite these drawbacks, this type of semi-finished product in strip form has become established throughout the world as a standard product for the lighting industry.

Furthermore, it is known, when using less high-grade aluminium support material in strip form, to apply to the support a layer of eloxal which consists of $Al_2O_3$ in a thickness of approx. 1 to 3 $\mu$m and is then applied to a multilayer optical system. The reduced thickness eloxal layer allows the surface to be sufficiently rough and hard and to be free from defects. A highly reflective high-purity aluminium layer is deposited on this eloxal layer. This high-purity aluminium layer is optically dense, about 50 to 80 nm thick and has a total reflection of more than 91% in the visible light range. Yet more layers which increase the reflection can be applied to this reflective layer. For example, a subsequent continuous strip coating which is described in the journal "Metalloberfläche" 50 (1996), 10, improves the optical efficiency of such aluminium strips up to a total light reflectivity of approx. 95%. However, the diffuse light reflectivity of material with a mirror nature is improved only to an insignificant extent. The optically active surface has a good mechanical load-bearing capacity and sufficient chemical resistance for use as a reflector material. However, the intermediate eloxal layer which serves as a smoothing layer is relatively brittle, so that there is a risk of cracks being formed in the event of extreme mechanical deformation processes.

A significant drawback of the two known optically active composite materials described above is that they are limited to aluminium as the support material. This entails complex, sometimes environmentally disadvantageous process steps during production, such as wet-chemical brightening, anodizing and, if appropriate, the vacuum coating or the need to use high-purity, specially rolled and therefore expensive starting material.

U.S. Pat. No. 5,527,562 has disclosed, as the intermediate layer, a levelling application to an aluminium support which serves as a substrate for a subsequent vacuum coating with an optically reflective layer system. This application is of an organic silicon sol which is applied to suitably pre-treated aluminium. The special sol is intended to bring about good levelling of the aluminium-strip surface and high total reflectivities after the coating in vacuo by sputtering of Al, $SiO_2$, $TiO_2$. A drawback of this arrangement is that the use of a very specific formulation for the sol layer necessitates a high process engineering outlay.

Furthermore, it is known that curved, rigid reflector bodies (e.g. for headlights) are provided with a levelling coating layer, to which a single-layer reflective application of aluminium is then applied in vacuo, and this in turn is provided with a protective layer. A drawback of this is that the total reflectivity does not exceed that of the aluminium layer, i.e. approx. 90%, and that the resultant surface does not exhibit sufficient mechanical strength. In particular, the surface is so unable to withstand loads imposed by forming operations that under standard industrial conditions further processing would be impossible.

The present invention is based on the object of providing a composite material, in particular for reflectors, of the type described in the introduction, with which it is possible, in a less complex and therefore less expensive manner, as required, to achieve any desired total reflectivity, in particular even values of over 95%, and any desired level of diffuse reflection, in particular even values of below 4% (according to DIN 5036) and which has a high mechanical strength and chemical resistance. The composite material should not be limited to a support made from aluminium and should be highly deformable.

According to the invention, this is achieved by the fact that a non-metallic protective layer, which consists of a low-absorption material and has a thickness of from 5 to 20 nm, preferably from 5 to 10 nm, is applied to the multilayer optical system.

The protective layer may preferably be a sputtered layer, in particular a layer produced by reactive sputtering, a CVD or PECVD layer or a layer which is produced by vaporization, in particular by electron bombardment or from thermal sources. The protective layer may consist predominantly of a material with a low refractive index, such as for example $SiO_2$.

The invention opens up entirely new technical and economic possibilities relating to the production of composite reflector materials. In particular, depending on requirements, it is possible, without reducing the mechanical strength of the composite material, to apply an eloxal layer or, in particular, a coating layer with a thickness which is adapted to the roughness of the support, which may characteristically lie within the range from about 2 to 20 $\mu$m, for the intermediate layer. The coating material may be a polycondensate produced on the basis of one or more monomers, a polyadduct or a polymer produced in particular by free-radical polymerization. Irrespective of the basis on which the coating-material mixture is produced, it is possible, by suitably selecting the mixture and/or the application process and/or the curing parameters, to set slight or, as far as possible, complete levelling of the support surface, resulting in a planar surface with a minimal roughness depth or a desired undulating or rough structure. Thus, with regard to its influence on the reflectivity, the coating material has the same importance as the rolled surfaces of the known aluminium strips.

In this case, the protective layer plays the major role. According to the current state of scientific knowledge in the field of optical physics, each further layer which is applied to a multilayer optical system comprising, for example, a metallic reflective layer and two interference layers positioned above it has a considerable adverse effect on the optical characteristics of the layer system. Surprisingly, according to the invention, it has proven possible—in contrast to this generally recognized scientific knowledge—to significantly increase not only the mechanical load-bearing capacity values (DIN 58165, part 5), but also to increase the reflectivity by approx. 1% point.

A further important aspect of the invention is the possibility of using an inexpensive metallic support which may consist of simple industrially rolled aluminium. However, it is also possible, according to the invention, to use other metallic support materials, such as magnesium, copper, titanium, molybdenum, tantalum or steel, such as for example stainless steel, or alloys containing these substances, such as for example brass, thus making it possible, on the one hand, to improve the mechanical properties of the composite material so as to achieve higher strength values, but, on the other hand, also allowing materials which are less expensive than aluminium to be used. The surface roughness of these materials is no longer important, since the surface structure of the composite material according to the invention is determined primarily by the intermediate layer, and the thickness of the intermediate layer can be adapted to the roughness of the support material.

Advantageously, the entire process of producing the composite material according to the invention can take place in a continuous process: the multilayer optical system and the protective layer can be applied to the intermediate layer using the continuous vacuum strip-coating process, while for the intermediate layer it is possible in particular to use formulations which can be applied using the coil-coating process, dried and, if appropriate, structured. These formulations are in particular stoving enamels with a toughness which can be preset by means of organic or inorganic solvents and which can be cured at temperatures of up to about 250° C. and are based on acrylic resins, epoxy resins, phenolic resins, melamin resins, urea resins or polyurethane resins. The curing takes place predominantly as a result of a crosslinking reaction due to activation of the double bonds which are present in the monomers. The enamel layers formed are distinguished by a high scratch resistance, extensibility and insensitivity to corrosive influences.

The coating materials used for the structure forming layer should predominantly be those which exhibit such flexural adhesion to the support that there is no delamination of the intermediate layer when a support with a material thickness of 0.4 mm is bent around a mandrel with a diameter of 2 mm and an adhesive strip of type Scotch 670 CFM, produced by 3 M, which has been previously stuck on and is also bent around the mandrel is pulled off.

Furthermore, it is advantageous, with regard to a vacuum coating which takes place after the application of the intermediate layer, to use a coating material which has a glass transition temperature of over 100° C. and a gas release rate of less than $1*10^{-4}$ mbar 1 $S^{-1}$ $m^{-2}$.

Further advantageous embodiments of the invention are given in the subclaims and in the following detailed description. The invention is explained in more detail with reference to a plurality of exemplary embodiments which are illustrated in the appended drawing, in which:

Throughout the various figures of the drawing, identical parts are always provided with the same reference numerals, so that generally they are also only described once in each case.

Figure 1:
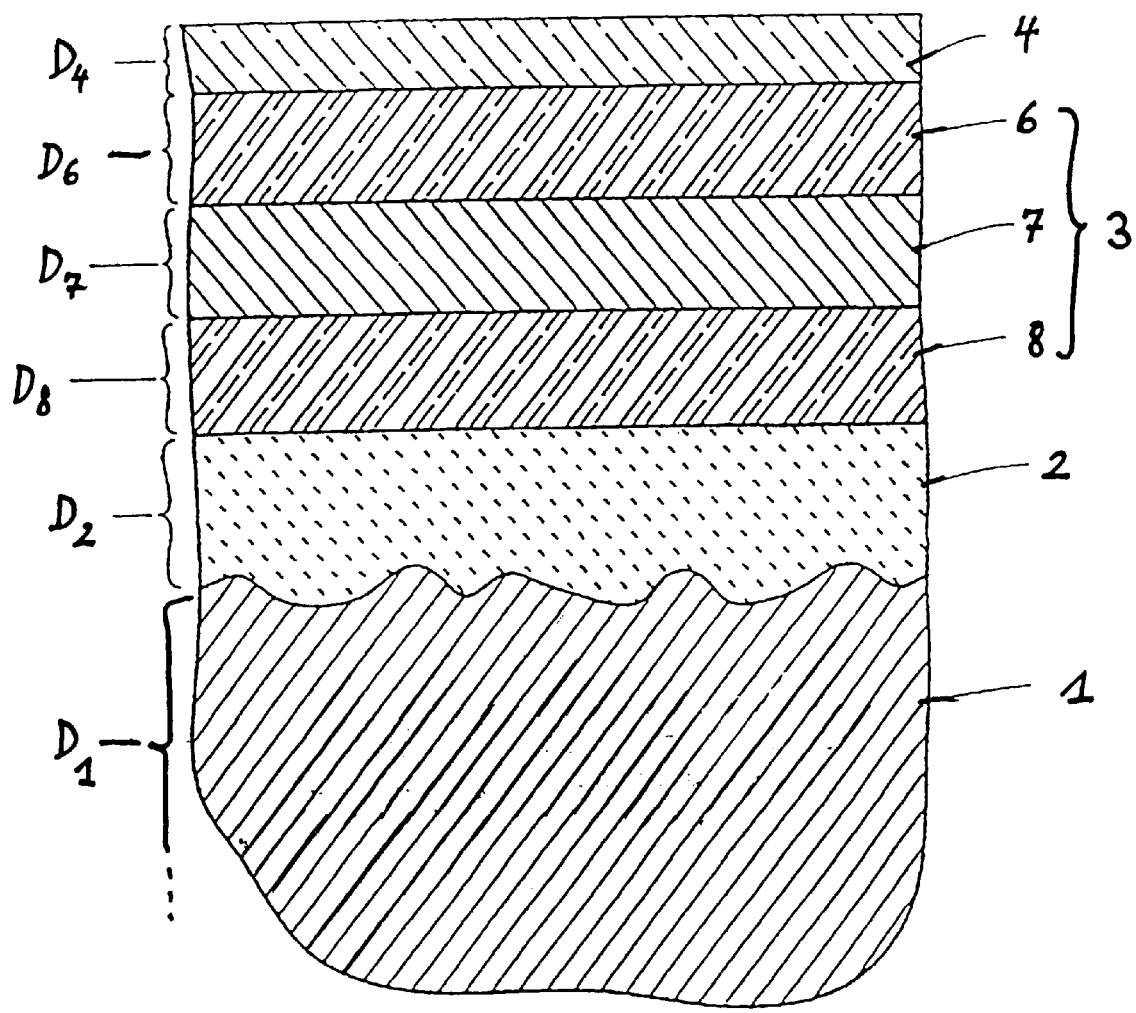
FIG. 1 shows a diagrammatic sectional illustration through a composite material according to the invention, which is characteristic of the first three exemplary embodiments.

In all the exemplary embodiments, a composite material according to the invention, in particular for reflectors, comprises a metallic support 1 which is in strip form and in particular is deformable, an intermediate layer 2 which is suitable for less complex adjustment of a surface structure which is the decisive factor in terms of the reflection properties, a multilayer optical system 3 which is applied to the intermediate layer 2, and a non-metallic protective layer 4 which is applied to the multilayer optical system 3 and comprises a low-absorption material. The intermediate layer 2, which is made from a coating material, is applied in a continuous process.

The support 1 in strip form may consist of aluminium, magnesium, copper, titanium, molybdenum, tantalum or steel, such as for example stainless steel, or of alloys containing these substances, such as for example brass.

In particular, the individual layers may be dimensioned in such a way that the composite material according to the invention is formed as a coil with a width of up to 1600 mm and a thickness of approximately 0.1 to 1.5 mm. In particular, the support 1 may preferably have a thickness $D_1$ of about 0.1 to 0.7 mm.

As shown by way of example in the fourth exemplary embodiment (FIG. 2), an adhesion-promoting interface layer 5, which is produced by chromating, phosphating, anodizing, galvanizing or the like, may be applied to the support 1 below the intermediate layer 2. It may also be expedient to pretreat the support 1 by wet-chemical and/or plasma-chemical means prior to the application of the coating material or to anodic oxidation, for cleaning purposes, in particular for degreasing.

An intermediate layer 2 which consists of a coating material is applied to the support 1. The coating material of the intermediate layer 2 may be a polycondensate which is produced on the basis of one or more monomers, a polyadduct or a polymer which is produced in particular by free-radical polymerization. It is particularly advantageous, as mentioned above, if the coating material of the intermediate layer 2 is suitable for a vacuum, i.e. has a glass transition temperature of over 100° C. and a gas release rate of less than $10^{-4}$ mbar 1 $S^{-1}$ $m^{-2}$.

With a view to continuous application of the intermediate layer 2, it is advantageously possible to use coating materials which are based on acrylic resin, epoxy resin, phenolic resin, melamin resin, urea resin or polyurethane resin, can be processed using the coil coating method, can be cured in particular at temperatures of up to about 250° C. and the viscosity of which can be set by means of suitable solvents.

In this case, the coating material may be cured in various ways:
- by multistage curing using UV radiation from lamps or lasers and/or electron beams,
- by curing using UV radiation from lamps or lasers and hot air,
- by curing using UV radiation from lamps or lasers and IR radiation,
- by curing using UV radiation from lamps or lasers and IR radiation from lasers, if appropriate in combination with hot air.

The thickness $D_2$ of the intermediate layer 2 may advantageously be adapted to the roughness of the support 1, values in the range from about 2 to 20 $\mu$m being characteristic.

On top of the intermediate layer 2 there is the multilayer optical system 3, which in all embodiments of the invention is applied to the intermediate layer 2 using the continuous vacuum strip-coating process. Also in all embodiments, the multilayer optical system 3 comprises three layers, the two upper layers 6, 7 being dielectric layers and the bottom layer 8 being a metallic, in particular aluminium, layer which is applied to the intermediate layer 2. This metallic layer may advantageously be produced by sputtering or by vaporization, in particular by electron bombardment or from thermal sources.

The material of the two upper layers 6, 7 of the multilayer optical system 3 may in chemical terms belong to the group consisting of the metal oxides, metal nitrides, metal carbides, metal fluorides or metal sulphides, and the two upper layers 6, 7 should have different refractive indices. The two upper layers 6, 7 of the multilayer optical system 3, like the bottom layer 8, may also be sputtered layers, in particular layers produced by reactive sputtering, or may be produced by vaporization, in particular by electron bombardment or from thermal sources. In addition, CVD or PECVD application processes can be used to form these layers. Application processes of this nature are distinguished by the possibility of achieving low layer-thickness tolerances; specifically, these tolerances do not exceed fluctuations within the range of approximately ±5%.

In all the exemplary embodiments, the protective layer 4 which is applied to the multilayer optical system consists of a dielectric material with a low refractive index, in particular of $SiO_2$. The thickness $D_4$ of the protective layer 4 is from 5 to nm, preferably from 5 to 10 nm, and it can be applied to the multilayer optical system 3 in a continuous vacuum strip-coating process.

As can be seen from FIG. 1, the intermediate layer 2 is of planar form in the first three exemplary embodiments. The arithmetic roughness average $R_a$ of the layer surface is in this case in the range from about 1 to 100 nm.

The first embodiment relates to a reflector material for visible light, in which in particular a total optical reflectivity determined according to DIN 5036 is at least 95% and a diffuse optical reflectivity is at most 4%. The bottom layer 8 of the multilayer optical system 3 consists of aluminium, and its thickness $D_8$ is such that the transmission through the layer 8 at the central wavelength of the reflection band is less than 0.5%. This thickness $D_8$ is approximately 60 nm. The layer 7 above it is an $SiO_2$ layer with a low refractive index and a thickness $D_7$ of about 90 nm, while the top layer 6, which is located above it, of the multilayer optical system 3 has a similarly high refractive index, consists of $TiO_2$ and has a thickness $D_6$ of about 60 nm. Both layers 6, 7 exhibit low absorption. The respective optical thicknesses $D_6$, $D_7$ of the two upper layers 6, 7 are such that they correspond to about one quarter of the vacuum wavelength of the spectral centre of the desired optical reflection band. This makes the complete layer system 3 virtually colour neutral. The two layers 6, 7, in materials technology terms, are in particular selected in such a manner that the difference between the refractive indices is as high as possible. The thickness $D_4$ of the protective layer 4 is about 10 nm.

The second embodiment relates to a reflector material for ultraviolet light, in which in particular a total reflectivity determined as set down by DIN 5036 is at least 95% and a diffuse reflectivity is at most 10%. The composite material differs from the first exemplary embodiment through the materials of high refractive index which are used in the top layer 6 of the multilayer optical system 3. In this case, instead of $TiO_2$, it is advantageously possible to use $ZrO_2$, $HfO_2$ with an optimum layer thickness $D_6$ of about 40 nm, or $Al_2O_3$ with an optimum layer thickness $D_6$ of about 45 nm; with $ZrO_2$, the short-wave application limit is about 240 nm, with $HfO_2$ is about 200 nm and with $Al_2O_3$ is about 200 nm. The $SiO_2$ layer of low refractive index lying beneath this layer advantageously has a thickness $D_7$ of about 50 nm, while the bottom, aluminium layer 8 of the multilayer optical system 3 has a thickness $D_8$ of about 90 nm. The thickness $D_4$ of the protective layer 4 made from $SiO_2$ is about 6 nm.

According to a third embodiment of the invention, a composite material according to the invention, as illustrated in FIG. 1, may also be provided with a multilayer optical system 3 which is such that a high absorbance determined in accordance with DIN 5036 is achieved. The lower metallic layer 8 on the coating-material surface, with a high absorbance, as well as the reflection-reducing dielectric layers 6, 7 lying above it, can be applied using the continuous vacuum strip-coating process. In this case, the layers 6, 7, 8 may be selected in such a way that they bring about a high total absorbance. A mechanical load-bearing capacity, determined in accordance with DIN 58196, of the surface of the composite material is—as with the first two embodiments and the fourth embodiment—better than H 50-1.

Figure 2:
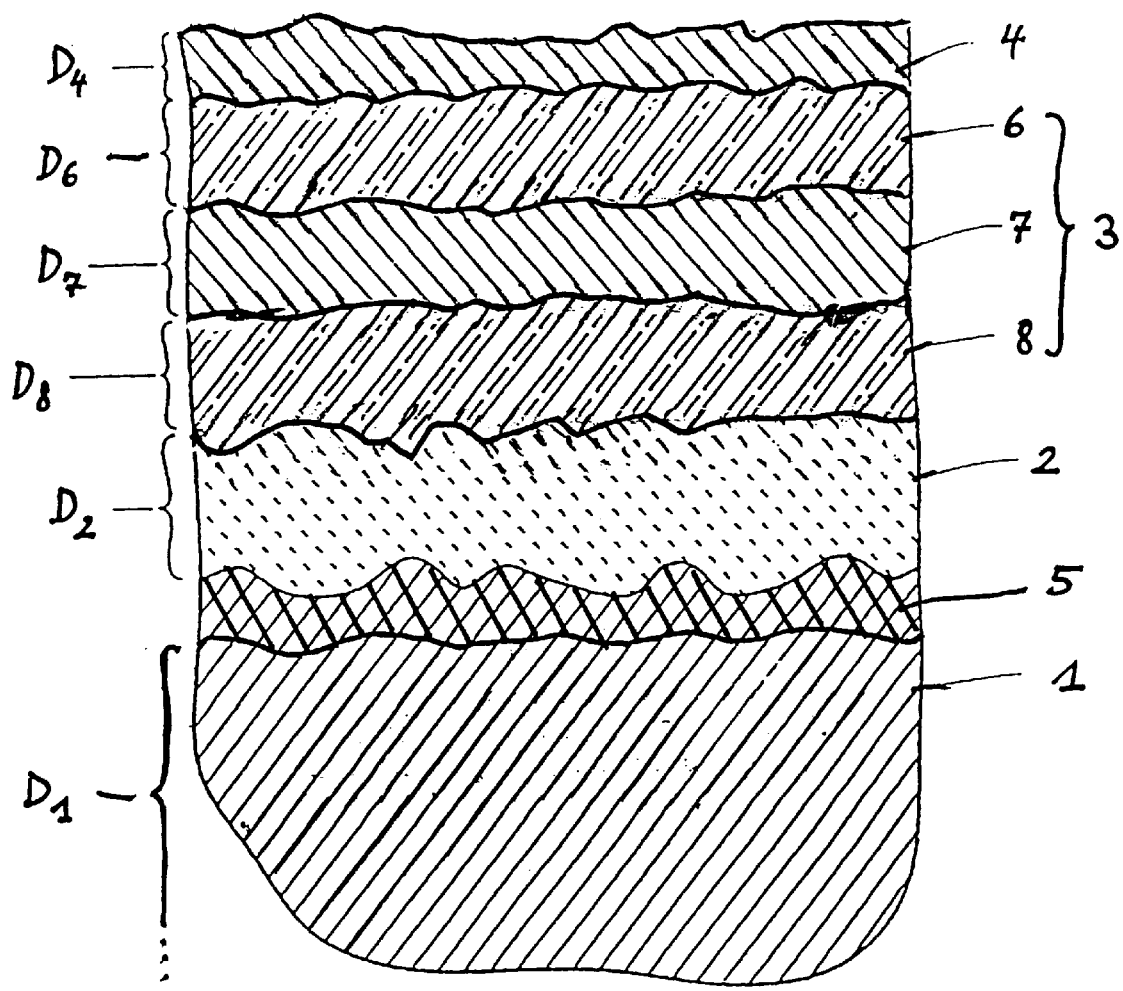
FIG. 2 shows a diagrammatic sectional illustration through a composite material according to the invention, which is characteristic of the fourth exemplary embodiment.

In the fourth exemplary embodiment of the invention, which is illustrated in FIG. 2, the intermediate layer 2 has an undulating or rough surface. The arithmetic roughness average $R_a$ of the layer surface is in this case in the range from about 0.1 to 5 $\mu$m. This structure may be formed directly by, the curing process or by a mechanical treatment which takes place during or after curing of the coating material, if appropriate with the introduction of additional energy. In this case, the energy may be introduced by the above-described options for curing the coating material, such as single- or multistage, optionally combined curing using UV radiation, electron beams, hot air and/or IR radiation. A composite material according to the invention which is constructed in this way has a diffuse optical reflectivity, determined in accordance with DIN 5036, which lies in the range from 4 to about 95%.

The possibility of using a coating material or an eloxal layer to produce the intermediate layer 2 imparts a high corrosion resistance to the support 1, the coating material at the same time allowing a high surface hardness and scratch resistance, at least corresponding to the surface properties of an eloxal layer, to be achieved. An intermediate layer 2 which consists of coating material furthermore has a high flexibility, so that considerable mechanical deformations can be carried out on the composite material according to the invention without any cracks, in particular microcracks, being formed. Thus, in all four exemplary embodiments described, the coating materials used exhibited a flexural adhesion to the support 1 which was such that, in the mandrel flex test and with a material thickness of the support 1 of 0.4 mm and bending around a mandrel with a diameter of 2 mm, there was no delamination of the intermediate layer 2 when an adhesive strip of type Scotch 670 CFM, produced by 3 M, which was previously stuck on and was also bent around the mandrel, was pulled off. The coating according to the invention can be washed and withstands, without problems, the stresses imposed by further processing in illumination engineering, in particular during the shaping processes which have to be carried out.

The present invention is not limited to the exemplary embodiments illustrated, but rather comprises all means and measures which have the same effect in the context of the invention. By way of example, the protective layer 4 according to the invention does not have to consist of $SiO_2$. Other suitable materials are those from the same chemical substance groups as those which can also be used for the upper two layers 6, 7 of the multilayer optical system 3. Furthermore, it is pointed out in particular that the intermediate layer 2 according to the invention does not absolutely have to be transparent, but rather may also, for example, be coloured, since the spectral properties of the reflected light are independent of this intermediate layer. A commercially available, standard industrial coating material can be used. A further advantage of the composite material according to the invention is that its edges are protected against corrosion.

Furthermore, the invention is not limited to the combination of features defined in claim 1, but rather may also be defined by any other desired combination of specific features of all the individual features disclosed overall. This means that in principle virtually any individual feature of claim 1 can be omitted or replaced by at least one individual feature disclosed at some other point in the application. To this extent, Claim 1 is merely to be understood as an initial attempt at formulating an invention.

List of Reference Symbols

1 Support
2 Intermediate layer
3 Multilayer optical system
4 Protective layer
5 Interface layer
6 Upper layer of 3
7 Middle layer of 3
8 Bottom layer of 3
$D_1$ Thickness of 1
$D_2$ Thickness of 2
$D_4$ Thickness of 4
$D_6$ Thickness of 6
$D_7$ Thickness of 7
$D_8$ Thickness of 8
$R_a$ Arithmetic roughness average

What is claimed is:

1. A composite material, in particular for reflectors, comprising:
a flexible metallic support having a roughness, configured to be capable of being formed into a coil;
an intermediate layer disposed on the metallic support, being planar and having a thickness of about 2 to 20 μm being adapted to the roughness of the support made of a coating material selected from the group consisting of a polycondensate, a polyadduct, a polymer produced by free-radical polymerization, whereby the material of said intermediate layer, its application process and curing parameters are selected in such a way that said intermediate layer has an arithmetic average value of roughness in the range from about 1 nm to 5 μm corresponding to a predetermined diffuse optical reflectivity in the range of not greater that 4% to about 95%;
a multilayer optical system disposed on the intermediate layer;
a non-metallic protective layer disposed on the optical multilayer system, which has a thickness from 5–20 nm, whereby the transmission, absorption and refractive indices, thickness and roughness, of the individual layers of said multilayer optical system, said non-metallic protective layer and said intermediate layer are configured in such a way that the composite material has a.total optical reflectivity of at least 95%, a mechanical load bearing capacity of greater than H 50-1 and wherein said composite is configured to withstand stresses imposed during illumination engineering shaping processes, such that no cracks form during processing.

2. The composite material according to claim 1 wherein said intermediate layer has an arithmetic average value of roughness in the range from about 1 to 100 nm and a diffuse optical reflectivity not greater than 4%.

3. The composite material according to claim 1 wherein the intermediate layer is a.coating layer in form of a stoving enamel having a predetermined toughness which can be cured at temperatures up to about 250° C. selected from the group consisting of acrylic resin, epoxy resin, phenolic resin, melamin resin, urea resin and polyurethane resin.

4. The composite material according to claim 1 wherein the coating layer has a glass transition temperature of over 100° C. and a gas release rate of less than $10^{-4}$ mbar 1 $s^{-1}$ $m^{-2}$.

5. The composite material according to claim 1 wherein said metallic support is selected from the group consisting of aluminum, magnesium, copper, titanium, molybdenum, tantalum, steel, stainless steel, brasses and mixtures thereof.

6. The composite material according to claim 1 further comprising an interface layer disposed between said metallic support and said intermediate layer, said interface layer being produced by a process selected from the group consisting of chromating, phosphating, anodizing, and galvanizing.

7. The composite material according to claim 1 wherein said multilayer optical system comprises three layers: a first dielectric layer, a second dielectric layer, and a third metallic layer, the third metallic layer being disposed onto said intermediate layer, the second layer being disposed onto said third metallic layer, and the first dielectric layer being disposed onto said second dielectric layer.

8. The composite material according to claim 7 wherein the metallic layer of said multilayer optical system has a predetermined thickness and wherein said third metallic layer has a transmission at a central wavelength of an incident spectral band which is less than 0.5%.

9. The composite material according to claim 7 wherein the first and second dielectric layers have different refractive indices and are selected from the group consisting of metal oxides, metal nitrides, metal carbides, metal fluorides, metal sulphides and mixtures thereof.

10. The composite material according to claim 7 wherein the first and second dielectric layer has a higher refractive index than the second dielectric layer of said multilayer optical system.

11. The composite material according to claim 7 wherein the first dielectric layer is made from a material selected from the group consisting of $TiO_2$, $ZrO_2$, $HfO_2$, $Al_2O_3$; and the second dielectric layer is $SiO_2$.

12. The composite material according to claim 7 wherein the thickness of the first and second dielectric layers are one-quarter of a central wavelength of an incident spectral band under vacuum.

13. The composite material according to claim 1 wherein said composite material is configured in the form of a coil with a width up to 1600 mm and a thickness of from about 0.1 to 1.5 mm.

14. The composite material according to claim 1 wherein said intermediate layer has an arithmetic average value of roughness in the range from about 0.1 to 5 $\mu$m and a diffuse optical reflectivity from 4 to about 95%.

15. The composite material according to claim 14 wherein the intermediate layer is a coating layer comprising a stoving enamel having a predetermined toughness which can be cured at temperatures up to about 250° C. selected from the group consisting of acrylic resin, epoxy resin, phenolic resin, melamin resin, urea resin and polyurethane resin.

16. The composite material according to claim 15 wherein the coating layer has a glass transition temperature of over 100° C. and a gas release rate of less than $10^{-4}$ mbar 1 s$^{-1}$ m$^{-2}$.

17. The composite material according to claim 14 wherein said metallic support is selected from the group consisting of aluminum, magnesium, copper, titanium, molybdenum, tantalum, steel, stainless steel, brasses and mixtures thereof.

18. The composite material according to claim 14 further comprising an interface layer disposed between said metallic support and said intermediate layer, said interface layer being produced by a process selected from the group consisting of chromating, phosphating, anodizing, and galvanizing.

19. The composite material according to claim 14 wherein said multilayer optical system comprises three layers: a first dielectric layer, a second dielectric layer, and a third metallic layer, the third metallic layer being disposed onto said intermediate layer, the second layer being disposed onto said third metallic layer and the first dielectric layer being disposed onto said second layer.

20. The composite material according to claim 19 wherein the metallic layer of said multilayer optical system has a predetermined thickness and wherein said third metallic layer has transmission at a central wavelength of an incident spectral band is less than 0.5%.

21. The composite material according to claim 19 wherein the first and second dielectric layers have different refractive indices and are selected from the group consisting of metal oxides, metal nitrides, metal carbides, metal fluorides, metal sulphides and mixtures thereof.

22. The composite material according to claim 19 wherein the first dielectric layer has a higher refractive index than the second dielectric layer of said multilayer optical system.

23. The composite material according to claim 22 wherein the first dielectric layer is made from a material selected from the group consisting of $TiO_2$, $ZrO_2$, $HfO_2$, $Al_2O_3$; and the second dielectric layer of said multilayer optical system is $SiO_2$.

24. The composite material according to claim 19 wherein the thickness of the first and second dielectric layers are one-quarter of a central wavelength of an incident spectral band under vacuum.

25. The composite material according to claim 14 wherein said composite material is a coil with a width up to 1600 mm and a thickness of from about 0.1 to 1.5 mm.

* * * * *

UNITED STATES PATENT AND TRADEMARK OFFICE
CERTIFICATE OF CORRECTION

PATENT NO.    : 6,627,307 B1
DATED         : September 30, 2003
INVENTOR(S)   : Werner Reichert and Klaus Ganz It is certified that error appears in the above-identified patent and that said Letters Patent is hereby corrected as shown below:

<u>Title page,</u>
Item [73], Assignee, "Alcon Singen GmbH" should be changed to
-- Alcan Singen GmbH --

Signed and Sealed this

Twenty-second Day of June, 2004

JON W. DUDAS
*Acting Director of the United States Patent and Trademark Office*